(12) United States Patent
Winget et al.

(10) Patent No.: US 8,227,523 B2
(45) Date of Patent: Jul. 24, 2012

(54) WATER-SOLUBLE PRODUCT

(75) Inventors: Carson K. Winget, Saint George, UT (US); Kenny D. Lewis, Saint George, UT (US)

(73) Assignee: Swingnuts Inc., Saint George, UT (US)

( * ) Notice: Subject to any disclaimer, the term of this patent is extended or adjusted under 35 U.S.C. 154(b) by 0 days.

(21) Appl. No.: 12/979,853

(22) Filed: Dec. 28, 2010

(65) Prior Publication Data

US 2012/0165427 A1   Jun. 28, 2012

(51) Int. Cl.
 *C08K 5/06* (2006.01)
 *C08K 5/05* (2006.01)
 *C08K 3/34* (2006.01)
 *C08K 3/40* (2006.01)

(52) U.S. Cl. ........ 523/124; 524/377; 524/379; 524/451; 524/494

(58) Field of Classification Search ................... 523/124; 524/377, 379, 451, 494
See application file for complete search history.

(56) References Cited

U.S. PATENT DOCUMENTS

| | | | |
|---|---|---|---|
| 7,677,315 B2 * | 3/2010 | Saini et al. ................. | 166/308.1 |
| 2011/0071238 A1 * | 3/2011 | Bastioli et al. .................. | 524/17 |

* cited by examiner

*Primary Examiner* — Kriellion Sanders
(74) *Attorney, Agent, or Firm* — Bingham McCutchen LLP

(57) ABSTRACT

Products which decompose when exposed to water are disclosed. The products comprise polyvinyl alcohol, talc, polyethylene glycol, and one or more of fiberglass and a titanium complex. The hardness or softness of the products may be varied by varying the relative amounts of talc, fiberglass, and titanium complex used therein. The products may be formed into items such as golf tees, stakes for ground-anchored structures, pellets for firearms, survey stakes and flags.

18 Claims, 2 Drawing Sheets

WATER-SOLUBLE PRODUCT

FIELD OF THE INVENTION

The present invention relates to products and compositions that break down rapidly in the environment.

BACKGROUND

Conventional outdoor products are typically composed of materials such as wood, plastic, or metal, which degrade slowly in the outdoor environment. When such outdoor products are lost or discarded outdoors, they persist in the outdoor environment for long periods of time, creating physical hazards for humans and animals and visually blighting the landscape. As a non-limiting example, golf tees, tent stakes, shotgun pellets, and survey stakes are all used, and frequently lost or discarded, outdoors; all of these products persist in the outdoor environment for long periods of time before degrading compared to their relatively short periods of use. There is a need for outdoor products made from materials that degrade more rapidly in the environment after they are used.

SUMMARY OF THE INVENTION

The present invention addresses the need described above by providing an outdoor product that degrades rapidly in the environment.

In one aspect, the present invention provides a composition that is useful for the manufacture of outdoor products. The composition comprises one or more water-soluble plastics including polyvinyl alcohol (PVA) or polyethylene glycol (PEG) and a mixture of stiffening materials.

In another aspect, the present invention provides an outdoor product comprising the compositions of the present invention.

In yet another aspect, the present invention includes methods of making an outdoor product of the present invention by injection molding.

BRIEF DESCRIPTION OF THE DRAWINGS

In the drawings, like reference characters generally refer to the same parts throughout the different views. Drawings are not necessarily to scale, as emphasis is placed on illustration of the principles of the invention.

Figure 1:
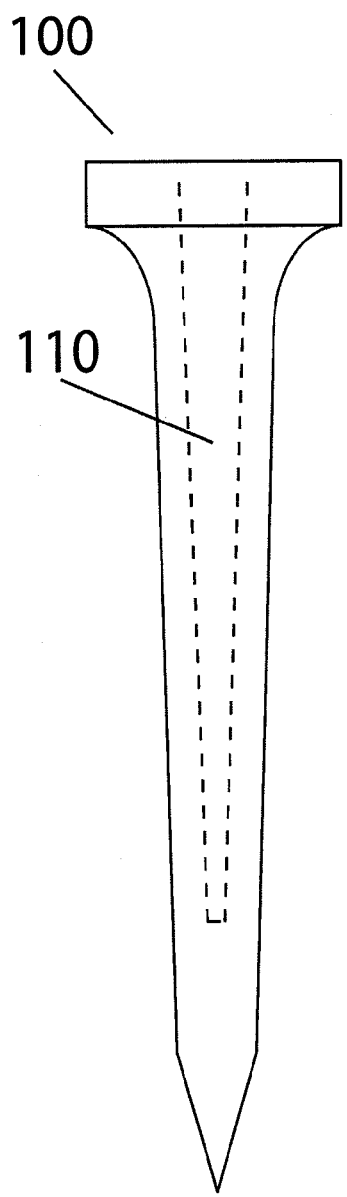
FIG. 1 is a schematic side view of a golf tee in accordance with an embodiment of the present invention.

DETAILED DESCRIPTION:

The present invention relates to outdoor products designed to decompose rapidly in the environment. In certain embodiments, the present invention utilizes a mixture of PVA, PEG and a suitable stiffener. PVA is water soluble and therefore is well suited to degrade rapidly in the environment, but lacks the rigidity necessary for outdoor applications. To overcome this problem, one or more stiffeners are added in amounts sufficient to provide the rigidity necessary for outdoor applications. In the preferred embodiment, the stiffeners will be talc and fiberglass or Tyzor® (E.I. du Pont de Nemours and Co., Wilmington, Del.) or a mixture of fiberglass and Tyzor®. As used herein, "Tyzor®" refers to a triethanolamine titanium complex such as Titanium (IV) (Triethanolamineaminato) Isopropoxide, sold under the trademark Tyzor® TE, or a lactic acid titanium complex such as Dihydrobis(Ammonium Lactato)Titanium sold under the trademark Tyzor® LA, or a mixture of the two. In other embodiments, other stiffeners known in the art may be used, including, but not limited to, calcium carbonate ($CaCO_3$).

In certain embodiments, fiberglass is used as a stiffener within products of the present invention in amounts up to 50% by mass of the final mixture. Preferably, fiberglass particles are mixed with pellets comprising PVA, PEG and talc prior to forming the product. Fiberglass may be used in any suitable shape or combination of shapes, such as fibers of varying length or diameter, or spheres of varying diameter. In a preferred embodiment, the composition includes a sufficient amount of a carrier such as a surfactant, soap, wax, or light oil to permit even distribution and adhesion of the fiberglass particles on the surfaces of the plastic pellets. The mixture is then formed into outdoor products by any suitable manufacturing process, such as injection molding.

In a preferred embodiment, the product is composed of 68.1% PVA, 12.20% PEG, 9.7% talc, and 10% fiberglass. In a second preferred embodiment, the product is composed of 68.7% PVA, 13% PEG, 8.3% talc and 10% fiberglass. In a third preferred embodiment, the product is composed of 61% PVA, 11.5% PEG, 7.5% talc, and 20% fiberglass. In a fourth preferred embodiment, the product is composed of 68.4% PVA, 12.6% PEG, 9.0% talc, and 10% fiberglass.

In certain embodiments, Tyzor® is used as a stiffener in amounts up to 20% by mass of the final mixture. Tyzor® may be too viscous to be added directly and used in injection molding machines. Thus, in certain embodiments, Tyzor® is diluted by adding 20% rubbing alcohol by mass and the diluted mixture is sprayed into a mixing vessel. The rubbing alcohol is removed from the Tyzor by evaporation, PVA, PEG and talc are added (preferably in particulate form), and the product is formed by injection molding.

In certain embodiments, Tyzor and fiberglass may be used simultaneously. In one embodiment, talc, fiberglass and Tyzor® are all used to stiffen the product, which is molded into outdoor products using an appropriate injection molding processes similar to those described above.

Compositions of PVA, PEG, talc and other stiffeners, when used at temperatures appropriate for injection molding, are highly viscous and may result in low injection molding yields when manufactured using injection molding machinery. To help increase such yields, certain embodiments of the present invention make use of a hot sprue and a hot runner and utilize a machine temperature of approximately 350°-380° C. during injection molding.

Products of the present invention are made in a variety of forms suitable for use outdoors, and are adapted to decompose rapidly after use. In one embodiment, the product is a golf tee, which may be discarded on a golf course and which will decompose upon exposure to moisture in the soil. In another embodiment, the product is a stake for a tent or other ground-anchored structure, which will decompose in the ground without the need to be removed. Additional embodiments include, without limitation: shot for use in shotguns or bb guns, and survey stakes and survey flags. Further embodiments will occur to those skilled in the art.

In certain embodiments, the product degrades rapidly upon exposure to water. In one embodiment, the product is at least 70% decomposed within 10 hours of exposure to a water-containing environment. In another embodiment, the product is at least 95% decomposed within 18 hours of exposure to a water-containing environment.

Figure 2:
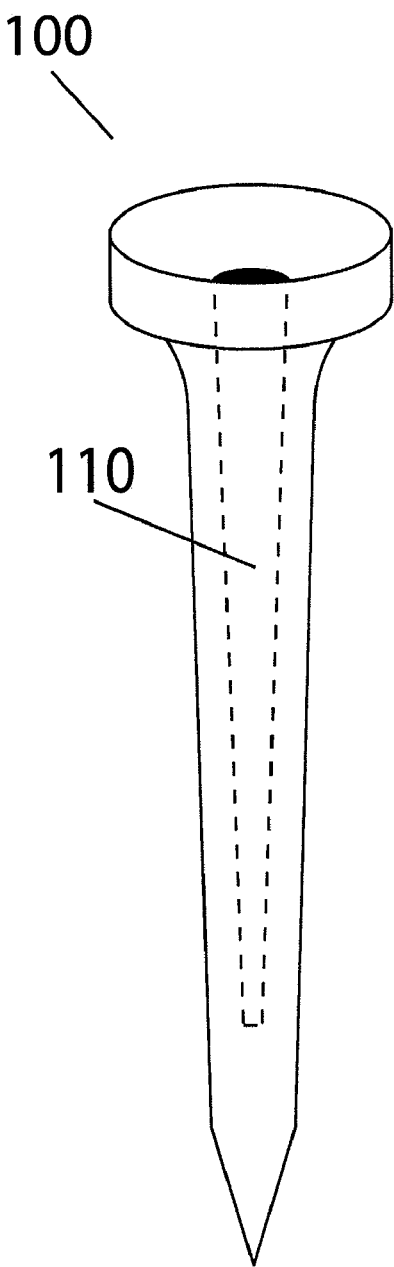
FIG. 2 is a schematic perspective view of a golf tee in accordance with an embodiment of the present invention.

Decomposition is retarded in certain embodiments by applying a coating of a water resistant material such as resin or wax to the exterior of the product. In other embodiments, decomposition is accelerated by increasing the surface area of the product relative to its volume. In certain embodiments, the product incorporates crenellations, folds, dimples, bumps, ridges, holes or other structural features to increase the surface area of the product relative to its volume. For example, in the embodiment illustrated in FIGS. 1-2, a golf tee 100 incorporates a bore-hole 110 through the shaft of the tee to increase the surface area of the tee which may be exposed to water.

Variations, modifications, and other implementations of what is described herein will occur to those of ordinary skill in the art without departing from the sprit and scope of the invention as claimed. Accordingly, the invention is to be defined not by the preceding illustrative description, but instead by the spirit and scope of the following claims:

We claim:

1. A product, consisting essentially of:
   between 50% and 75% by weight of polyvinyl alcohol;
   between 5% and 15% by weight of polyethylene glycol;
   between 5% and 20% by weight of talc; and
   between 5% and 30% by weight of fiberglass,
   wherein the product is a golf tee.

2. The product of claim 1, wherein the product is configured to decompose by at least 70% within 10 hours of exposure to a water-containing environment.

3. The product of claim 2, wherein the product is configured to decompose by at least 95% within 18 hours of exposure to a water-containing environment.

4. A product, consisting essentially of:
   between 60% and 75% by weight of polyvinyl alcohol;
   between 5% and 15% by weight of polyethylene glycol;
   between 5% and 25% of talc; and
   between 2.5% and 20% by weight of a titanium complex
   wherein the product is a golf tee.

5. The product of claim 4, wherein the titanium complex is selected from the group consisting of a triethanolamine titanium complex, a lactic acid titanium complex, and combinations thereof.

6. The product of claim 4, wherein the product is configured to decompose by at least 70% within 10 hours of exposure to a water-containing environment.

7. The product of claim 6, wherein the product is configured to decompose by at least 95% within 18 hours of exposure to a water-containing environment.

8. A product, consisting essentially of:
   fiberglass;
   polyvinyl alcohol;
   polyethylene glycol;
   talc; and
   a titanium complex,
   wherein the product is a golf tee.

9. The product of claim 8, wherein the product is configured to decompose by at least 70% within 10 hours of exposure to a water-containing environment.

10. The product of claim 9, wherein the product is configured to decompose by at least 95% within 18 hours of exposure to a water-containing environment.

11. The product of claim 8, wherein said product is one of a golf tee, a survey stake, a tent stake, or a pellet for use in a firearm.

12. The product of claim 8, wherein the titanium complex is selected from the group consisting of a triethanolamine titanium complex, a lactic acid titanium complex, and combinations thereof.

13. The product of claim 8, wherein the polyvinyl alcohol and fiberglass are in particulate form.

14. A product, consisting essentially of:
   between 49.9% and 75% by weight of polyvinyl alcohol;
   between 4.9% and 15% by weight of polyethylene glycol;
   between 4.9% and 20% by weight of talc;
   between 4.9% and 30% by weight of fiberglass; and
   between 0.01% and 0.05% of a carrier selected from the group consisting of wax, oil, and surfactant
   wherein the product is adapted to be injection molded into a golf tee.

15. The product of claim 14, wherein the golf tee is configured to decompose by at least 70% within 10 hours of exposure to a water-containing environment.

16. The product of claim 15, wherein the golf tee is configured to decompose by at least 95% within 18 hours of exposure to a water-containing environment.

17. The product of claim 14, wherein the titanium complex is selected from the group consisting of a triethanolamine titanium complex, a lactic acid titanium complex, and combinations thereof.

18. The product of claim 14, wherein the polyvinyl alcohol and fiberglass are in particulate form.

* * * * *